May 16, 1939.    H. LEMP    2,158,133
CONTROLLING DEVICE
Filed May 3, 1937    3 Sheets-Sheet 1

INVENTOR
HERMANN LEMP
BY
Pennie Davis Marvin & Edmonds
ATTORNEYS

May 16, 1939.  H. LEMP  2,158,133
CONTROLLING DEVICE
Filed May 3, 1937  3 Sheets-Sheet 2
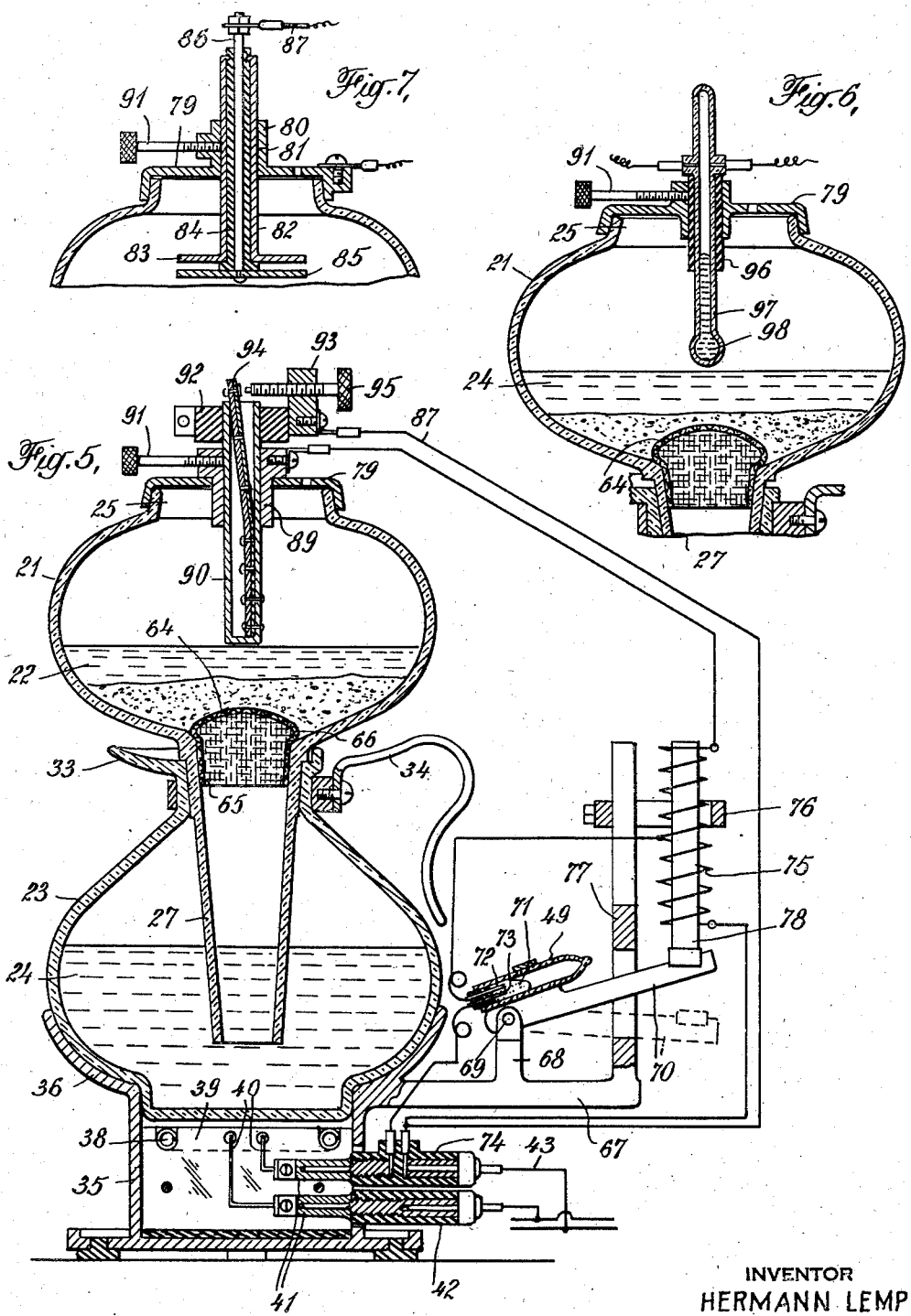
INVENTOR
HERMANN LEMP
BY
Pennie Davis Marvin & Edmonds
ATTORNEYS May 16, 1939. H. LEMP 2,158,133
CONTROLLING DEVICE
Filed May 3, 1937 3 Sheets-Sheet 3
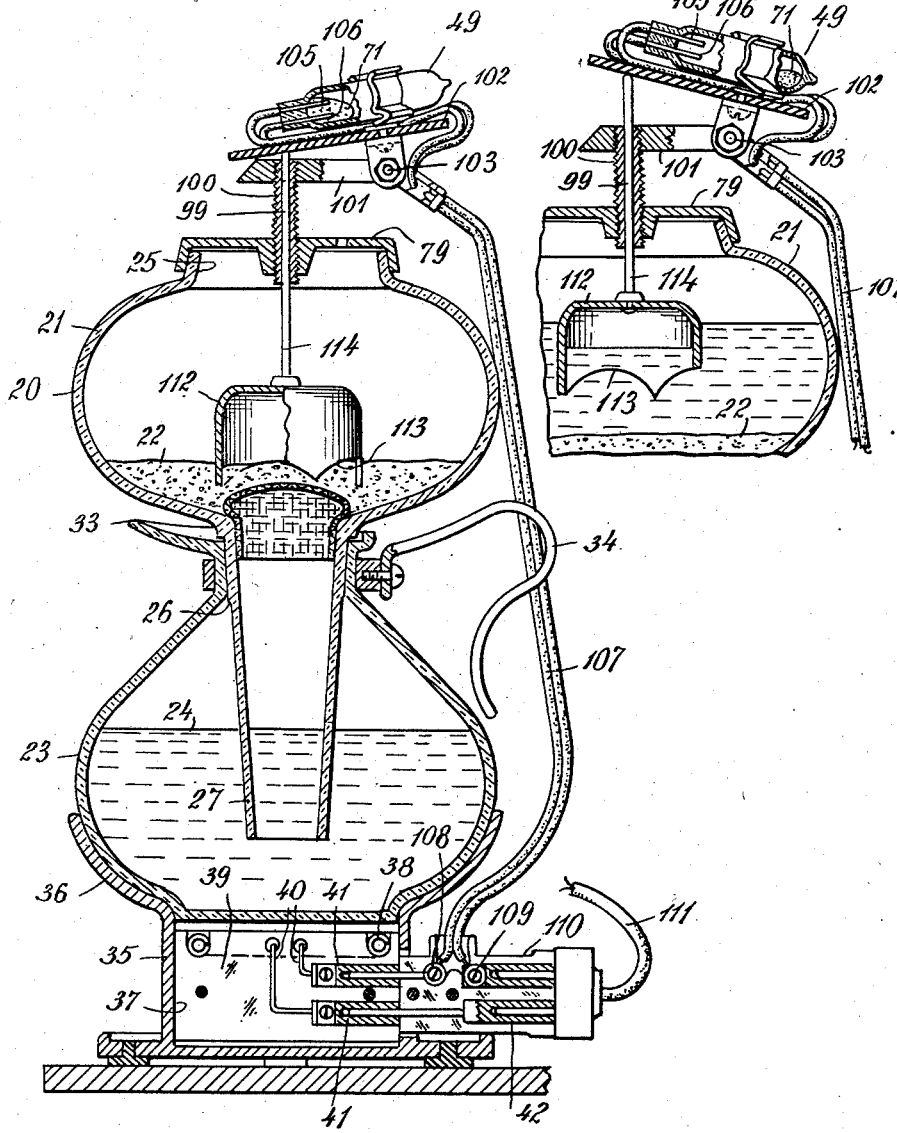
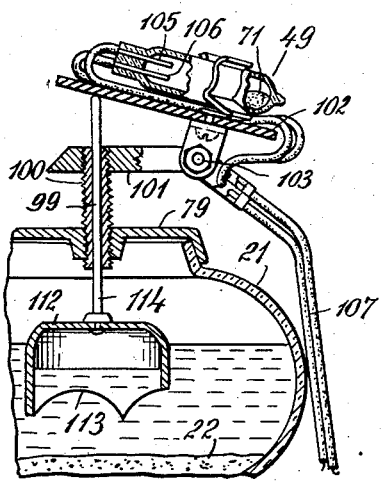
INVENTOR
HERMANN LEMP
BY
ATTORNEYS Patented May 16, 1939

2,158,133

UNITED STATES PATENT OFFICE 2,158,133

CONTROLLING DEVICE

Hermann Lemp, Glen Rock, N. J.

Application May 3, 1937, Serial No. 140,321

18 Claims. (Cl. 219—43)

This application is a continuation in part of my application Serial No. 721,256, filed on April 19, 1934.

This invention relates to controlling devices, especially for electrically operated culinary apparatus, such as coffee-makers and the like.

More particularly, the controlling device is intended for use in connection with electrically operated coffee-makers of the vacuum type comprising a pair of glass vessels and a transfer tube through which the liquid used for infusing the aromatic material, such as coffee or tea, is transferred to one vessel or the other. The liquid which is initially placed in the lowermost vessel is heated therein by an electrical heating element and is discharged through the transfer tube into the vessel containing the coffee.

In the present arrangement of this character the heating element is usually connected to or disconnected from the source of energy supply by manual act. It is obvious, therefore, that unless constant thought be given to this detail of operation the infusion period may be extended unnecessarily beyond that required to produce the desired flavor of the beverage and, as frequently happens, a considerable wastage of current may result through failure to cut-off the supply of current to the heating element, or the vessel may become fractured if exposed to intense heat after all the water has been discharged from the vessel.

It is accordingly an object of the invention to effect the cut-off of current to the heater by automatic means operating at the desired point in the cycle. A further object is to accomplish this by a mechanism that can be used with existing coffee-makers and is simple and certain in its operation.

Figure 1:
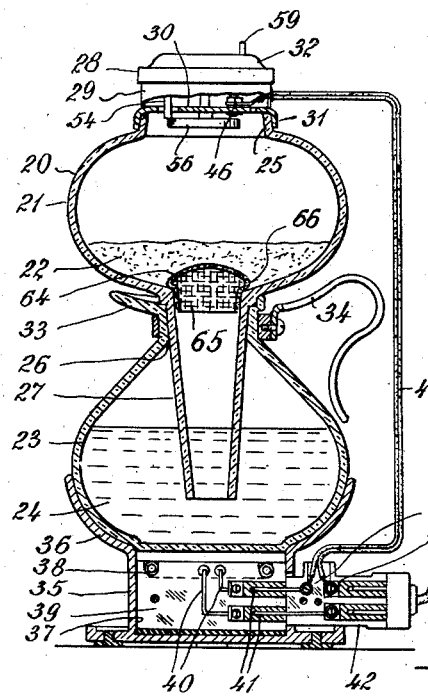
Figure 2:
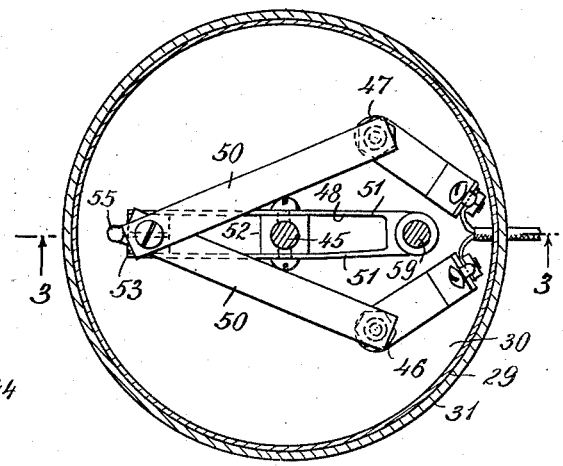
Figure 3:
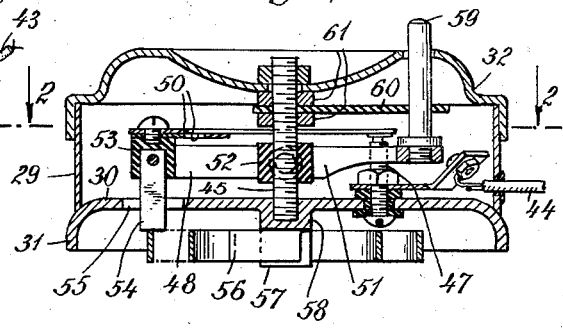
Figure 4:
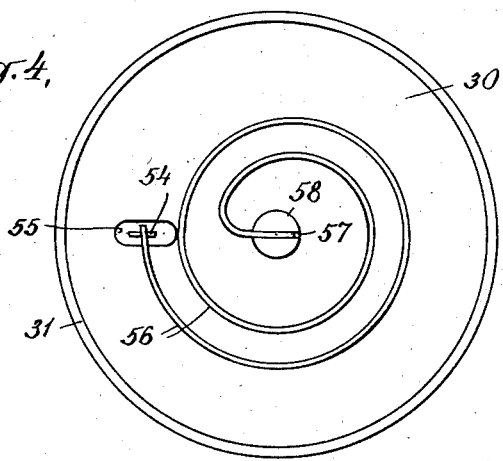

In the accompanying drawings,

Fig. 1 is a view in elevation of a coffee-maker equipped with a controlling device of one form embodying the invention, Fig. 2 is a top plan view of the contactor parts of the cover for the receptacle or upper bowl of the coffee-maker shown in Fig. 1, the view being on the line 2—2 of Fig. 3, Fig. 3 is a view in vertical section, on the line 3—3 of Fig. 2 of the same cover, Fig. 4 is a plan view of the underside of the same cover showing the thermostatic element, Fig. 5 is a sectional elevation of another form of invention, Fig. 6 is a partial view of another form of the invention employing a different type of thermostatic element, Fig. 7 is a further modification in respect to the element which initiates the operation of the relay of the Fig. 5 and Fig. 6 device, Figs. 8 and 9 are elevations, in section, of a coffee-maker equipped with still another modified form of the invention and showing the control switch in the circuit closing and opening positions, respectively.

Referring to the drawings, and at first more particularly to the form of the invention illustrated in Figures 1 to 4, 20 designates, in general, a coffee-maker of the known vacuum type comprising an upper bowl or receptacle 21 containing aromatic material, such as ground coffee 22, and the lower bowl 23 which is a container into which water 24 is initially placed. The lower bowl is the heating chamber. The upper bowl is the steeping or infusion chamber. A cover 28 rests in normal closing position on the upper bowl at its rim 25.

On the bottom of the receptacle 21 is an integral tube or transfer member 27 which extends through the opening 26 in the lower bowl and into the liquid 24 to convey liquid from the container to the receptacle, and vice versa, thus putting the two in liquid communication. The coffee is retained in the receptacle or upper bowl 21 by means of a filter 64 which has a skirt 65 extending into the transfer tube 27 and a flared valve portion 66 which seats on the bottom of the receptacle 21 at its juncture with the tube 27. This filter permits the liquid to pass through it while retaining the coffee above it. At the upper end of the container or lower bowl 23, and adjacent the opening 26, is a spout 33 through which the liquid extract may be poured and a handle 34 is secured to the container for convenience in serving the beverage.

Beneath the container 23 is a base member 35 having a flared upper portion 36 to accommodate the lower bowl, and the interior of the base 35 serves as a chamber for a resistor or electrical heating element 38 which lies in close proximity to the bottom of the lower bowl. The resistor is embedded in an insulator 39 and its terminals 40 are connected to socket members 41 which are also embedded in the insulator 39. The socket members 41 may be of a well known type adapted to accommodate the terminals of a plug 42 connected to a main electrical circuit 43 which supplies current to the resistor.

The present invention contemplates equipping the coffee-maker with devices intended to operate automatically and in correct sequence with respect to the transference of liquid into the receptacle for cutting off the supply of current to the resistor. To this end, in the form shown in Figures 1 to 4, there is provided a thermostatically operated circuit breaker incorporated in the cover 28 of the upper bowl 21. This device comprises a thermal responsive element exposed to the temperature of the upper bowl, the vapor temperature in particular, together with a circuit breaker and a mechanism by which the thermal element can cause the circuit breaker to open the circuit. Preferably the thermal element is used also to hold the circuit breaker in closed position until the desired temperature is reached.

The cover here shown consists of a base 30 having an annular flange 31 on its under surface which fits over the rim 25 of the upper bowl 21. The circuit-breaker parts are mounted on the upper side of this base 30 and are enclosed by a top member 32 and an annular collar forming a side enclosure 29, the top member 32 being mounted on a central post 45 that is threaded into the base 30. A nut threaded on the upper end of the post holds the top and side members to the base.

There are two conventional terminal post units 46 and 47 mounted at one side of the base 30 to form the fixed contacts of the circuit breaker (see Fig. 3). Each terminal post unit consists of a screw post extending up through an opening in the base, with insulating washers surrounding it at the upper and lower surfaces of the base and an insulating collar within the opening through which the screw passes, so that the screw is insulated from the base. A nut holds the entire assembly, including the terminal clip to which one lead wire 44 is connected.

The lead wires 44 from the two terminal posts are connected in series with the main circuit 43 by being connected to terminals 108, 109 in the plug 42 in such a way that when the plug is inserted a series connection is established. By reason of this connection, the heater circuit is open at the two terminal posts and can be closed only by the movable or commutator element of the circuit breaker.

The commutator element consists of a rocking frame 48, mounted on the central post 45 in such a way that it can rock vertically, and two angularly arranged commutator arms 50 which are secured to this rocking frame at the opposite side of the center from the two fixed terminal posts 46, 47. These arms extend out over the two fixed terminal posts. When the rocking frame is tilted in one direction these arms come into contact with the tops of the posts; and are lifted away from the posts when the frame is tilted in the other direction.

The frame 48 consists of two side members 51 which are mounted on a block 52 which surrounds and is held to the central post 45. These arms are of insulating material. At the rear end of the frame there is a block of metal 53 between the two arms and secured to them. This serves two purposes. It affords a means by which the two commutator arms 50 are secured to the frame, the overlapping ends of these arms being screwed to the block 53, and it also serves as a weight which tends to tilt the frame downward on that side thus tending to lift the commutator arms away from the terminal posts to open the circuit. This gives the circuit breaker a normal bias toward open circuit position.

There is a projection 54 extending downward from this rear end of the frame and through an opening 55 in the base 30 so that it lies in the path of the end of a spiral, bi-metallic thermostatic element 56 mounted on the lower side of the base 30. The inner end of this spiral thermostatic element 56 is secured in a slot 57 in a boss 58 on the under side of the base 30. It is so arranged that at normal temperature the outer end of the spiral element extends across the opening 55 in the base, thus preventing the projection 54 from dropping through and thereby holding the rocking frame in the position in which the commutator arms 50 engage the terminal posts. When heated, the spiral thermostatic element reacts by expanding, with the result that its outer end is drawn backward so as to clear the projection 54 on the rocking frame and let it drop through. The end wall of the outer end of this spiral element is sloped downwardly and backwardly so that when withdrawn there is no end wall down which the projection 54 must slide. This promotes a more rapid and certain action of the circuit breaker.

To close the circuit, after the thermostat has caused the contactor to open it, there may be provided a push button 59 which extends through the top 32 and is mounted on an extension of the rocking frame 48 on the side opposite from that of the projection 54. A guide for this push button is provided in the form of a strip of stiff insulating material 60 which is attached at one end to the center post 45 by means of two nuts 61 and extends above and parallel to the frame 48. It has an opening at its outer end to receive the shank of the push button 59 and thus support it. Or, if desired, the forward part of the rocking frame may be extended through the side wall 29 so as to be exposed to direct manual engagement.

The contactor is closed by pressing the push button 59 to rock the frame 48, thus bringing the commutator arms 50 down against the terminal posts 46, 47 and thereby closing the circuit. The contactor is held closed because when the frame is thus tilted, the projection 54 at its outer end is raised and that permits the end of the thermostatic element to move across the opening 55 in the base and prevent the projection 54 from again dropping through. This movement of the outer end of the thermostatic element is caused by the resilience of the element itself, it being assumed that the operation now being described is attempted when the temperature in the upper bowl is relatively low.

When the liquid is heated in the lower bowl and is forced into the upper bowl by the resulting vapor pressure, the temperature in the upper bowl increases because the liquid is close to its boiling point. When all of the liquid has been transferred, that is to say when the liquid level in the lower bowl is lowered to the bottom of the transfer tube, vapor comes through in considerable volume and passing through the liquid fills the space in the upper bowl above the liquid. The temperature of this vapor when above the liquid is somewhat lower than the temperature of the liquid but is definitely related to it. It is the temperature of this vapor to which the thermostatic element is directly exposed.

The thermostat may be set for any desired temperature over a considerable range. The temperature may be that which prevails when the vapor surges through after all the liquid has been transferred, that being a cut-off point which many find to be suitable, or it may be a higher or a lower temperature giving respectively a longer or a shorter infusion period. The prolonged period is possible because there is a gradual rise of temperature during the transfer of liquid, which continues after all of the liquid has been transferred. If the selected cut-off temperature is not attained until some time after the liquid transfer, the result is to defer the opening of the circuit and thus prolong the period of infusion. If a cut-off temperature is selected which is reached before all of the liquid is transferred, the infusion period is shorter. By slightly altering the configuration of the spiral thermostatic element to vary the extent of travel of its outer end before releasing the circuit breaker, the cut-off point may be regulated to give a longer or shorter infusion period, although acting in all cases to accomplish the same general object of cutting out the heater when the heated liquid is transferred to the upper bowl, so that the automatic return to the lower bowl may take place after the infusion period.

In Figs. 5 and 6 there is shown a form of the invention embodying an indirect control of the circuit breaker. The circuit breaker is controlled directly by a differential relay which in turn is controlled by a thermal responsive element mounted on the cover of the infusion chamber. Two different forms of thermal element are shown in Figs. 5 and 6 respectively. The same relay controlled circuit breaker is used with both.

In this form of the invention the base 35 has a lateral extension 6 having an upturned arm 68 at the upper end of which is pivoted, as at 69, an end of a lever 70. Mounted upon the lever, preferably immediately above the pivot 69, is a mercury switch 49 having a globule of mercury 71, forming a movable contactor, and the fixed terminals 72 and 73 which are connected in series with the resistor 38.

The terminal 73 is preferably connected directly to one end of the resistor, as through an adaptor 74, and the opposite end of the resistor may be in direct communication, through the adaptor, with a wire of the main circuit 43. The terminal 72, in the present instance, is connected to the intermediate portion of the winding of a differential relay 75 and the lower end of the winding of the relay is connected through the adaptor with the other wire of the circuit 43.

The relay 75 may be supported in any suitable manner, as by a clamp 76 bolted to a post 77 on the extension 67, and the lever 70 extends with its free end to a point beneath the armature 78 so that, upon energization of the relay, the armature 78 will raise the lever 70 and tilt the switch 49 to its closed position.

The opposite or upper end of the winding of the differential relay 75 is connected, by way of example, to a metallic cover 79 forming a closure for the receptacle 21. The cover 79 is provided with a bushing 89 into which extends slidably a casing 90. The casing 90 is adapted to slide, for adjustment, in the bushing 89 in order to raise and lower it with respect to the liquid in the receptacle. In the bushing 89 is a set screw 91 whereby the casing may be clamped in placed position in the bushing.

The bushing 89 is connected to the upper end of the winding of the relay 75 and on the portion of the casing 90 extending above the bushing is an insulator 92 carrying a metallic block 93 which is connected to the portion of the circuit leading from the lower end of the relay winding to the adaptor 74. The casing 90 contains a bi-metal thermostatic element 94 which is affixed at its lower end to the casing and, in contacting position, seats with its other end against a screw 95 threaded into the block 93.

The operation of this form of the invention is as follows: After the ingredients for making the coffee have been placed in the container and the receptacle the arm 70 is tilted upwardly. The globule of mercury 71 then closes the circuit to energize the lower part of the winding of the relay 75. The lever 70 is thereafter retained in the elevated position by the armature 78.

With the switch 49 in the circuit-closing position current is supplied to the heating element 38 and the water 24 is heated and transferred into the receptacle through the tube 27. When the water rising in the receptacle causes the bi-metallic thermostat element 94 to move into contact with the other terminal 95, current flows into the upper end of the relay winding to neutralize the magnetic effect of that in the lower half of the winding. The lever 70 is then released and, dropping, tilts the switch 49 to the circuit-opening position. In this way the current to the resistor is automatically cut-off and the process of condensation may immediately commence within the container preparatory to the return of the liquid extract to the container.

In the operation of this form of the invention, whenever the amount of liquid placed in the container, and subsequently transferred into the receptacle, is varied, the casing 90 may be raised or lowered to place the element 94 in substantially the correct position to assure its action for supplying a neutralizing current to the upper half of the relay winding at the desired time.

In the form of the invention illustrated in Figure 6 a bushing 96 is disposed slidably in the cover 79 and clamped in position by a set screw 91 in the cover. Within the bushing 96 is a glass tube 97 containing volatile liquid, such as mercury 98, and extending into the tube at a point above the cover 79 are the ends of the wires leading to the upper half of the relay winding and to the adaptor.

In the operation of this form of the invention and with the tube 97 set at the correct elevation with respect to the amount of liquid, the heat of the liquid causes the mercury 98 to rise and establish contact between the wires. The upper half of the relay winding is then also energized and the lever 70 will drop and tilt the switch 49 to its circuit-opening position.

In the modified form shown in Fig. 7 the element which controls the differential relay consists of two contacts, normally insulated so as to hold the circuit open, but so disposed in the infusion chamber that when the liquid rises to the desired level it bridges the contacts and completes the relay circuit, thus causing the relay to tilt mercury switch 49 and cut out the heater. These contact elements are mounted in the cover 79, which has a central boss 80 having an opening 81 through which there extends a metal tube 82 having a flange 83 at its lower end. This tube, being in direct engagement with the boss 80 which is a part of the cover 79 is thus electrically connected to one wire leading to the upper part of the differential relay coil 75. Within the tube 82 is a rod 86 surrounded by insulating material 84. There is a flange 85 at the lower end of the rod 86 spaced somewhat below the flange 83. This rod 86 is connected by a wire 87 to the other side of the relay coil. The entire assembly, consisting of the tube 82, the insulation 84 and the rod 86, can be adjusted to correspond to the different levels of the liquid. A set screw 91 holds the assembly in any particular position. When the liquid rises, it bridges the two flanges 83 and 85 and completes the circuit between them, thus energizing the upper part of the relay coil and causing the switch 49 to be opened.

In the modification illustrated in Figs. 8 and 9 a stem 99 having exterior threads 100 is threaded into the cover 79 and a bar 101 is threaded to the upper end of the stem to support a holder 102 which is pivoted at one end to the bar, as on a bolt 103, and overlies the stem 99 with its free end.

Arranged on the holder 102 is a mercury switch 49 whose terminals 105 and 106 are connected, by means of wires 107, to relatively spaced terminals 108 and 109 of an adaptor 110. The terminal 108 is seated in a socket member 41 of the heating element 38, and the terminal 109 is connected to one of the wires of a supply circuit 111 while the other terminal or socket member of the resistor 38 is connected directly to the remaining wire of the supply circuit 111.

The receptacle 21 contains a float 112, preferably in the form of an inverted cup member having a scalloped edge 113 to provide free communication between the interior of the cup and the receptacle and carries a rod 114 which extends slidably through the stem 99 to abut the overlying portion of the holder 102.

The operation of the device is as follows: With the switch 49 occupying its closed position current flows to the resistor 38 to heat the water and cause its transference to the receptacle 21. As the water rises in the receptacle the float 112 rises with the water and tilts the switch 49 about the pivot 103.

When the switch 49 passes above the horizontal the globule of mercury moves out of contact with the terminals and the current supply to the resistor will thus be cut off. The switch may then be further tilted about its pivot in the same direction to assure against its return to the circuit-closing position.

Should the amount of water be varied to produce an increased or decreased volume of beverage, the switch 49 may be raised or lowered accordingly, by manipulating the stem 99, to cause the float to act in accordance with the variation of the level of the liquid in the receptacle.

Various modifications of the structure here described may be made within the scope of the invention defined in the following claims.

I claim:

1. In a vacuum type coffee maker, having a heating chamber and an infusion chamber with a transfer connection therebetween, an electrical heater for the heating chamber and means responsive to thermal conditions in the infusion chamber for cutting out the heater when the heated liquid is transferred to the infusion chamber.

2. In a vacuum type coffee maker, having a heating chamber and an infusion chamber with a transfer connection therebetween, an electrical heater for the heating chamber and control means for the circuit of said heater comprising a thermal responsive element located in the infusion chamber whereby to cut out the heater when the heated liquid is transferred to the infusion chamber.

3. In a vacuum type coffee maker, having a heating chamber and an infusion chamber with a transfer connection therebetween, an electrical heater for the heating chamber, a cover for the infusion chamber and automatic control means for the circuit of said heater comprising a thermal responsive element mounted on said cover, whereby to cut out the heater when the heated liquid is transferred to the infusion chamber.

4. In a vacuum type coffee maker, having a heating chamber and an infusion chamber with a transfer connection therebetween, an electrical heater for the heating chamber, a cover for the infusion chamber and automatic control means for the circuit of said heater mounted on said cover, whereby to cut out the heater when the heated liquid is transferred to the infusion chamber.

5. In a vacuum type coffee maker having a lower heating bowl and an upper infusion bowl with a transfer connection therebetween, an electrical heater for said lower bowl, a cover on said upper bowl and automatic control means for the circuit of said heater comprising a thermal responsive element mounted on said cover, whereby to cut out said heater when the heated liquid is transferred to the upper bowl.

6. In a vacuum type coffee maker having a lower heating bowl and an upper infusion bowl with a transfer connection therebetween, an electrical heater for said lower bowl, a cover on said upper bowl and automatic circuit control means mounted on said cover and arranged to cut out said heater in response to substantial completion of the transfer of liquid to the upper bowl.

7. In a vacuum type coffee maker having a heating chamber, an infusion chamber, a transfer connection therebetween and an electrical heater for the heating chamber, a cover for the infusion chamber comprising a circuit breaker within said cover for opening and closing the heater circuit, and a thermostatic element exposed to the vapor temperature in the infusion chamber and adapted when heated to cause the circuit breaker to open the heater circuit.

8. In a vacuum type coffee maker, having a heating chamber, an infusion chamber, a transfer connection therebetween and an electrical heater for the heating chamber, a cover for the infusion chamber comprising a partition arranged to extend across the mouth of said chamber, a thermostatic element on the inner side of the partition, a circuit breaker on the other side of the partition for opening and closing the heater circuit and means by which the thermostatic element when heated causes the circuit breaker to open the heater circuit.

9. In a vacuum type coffee maker, having a heating chamber and an infusion chamber with a transfer connection therebetween, an electrical heater for the heating chamber, a cover for the infusion chamber comprising a partition arranged to extend across the mouth of said chamber, a thermostatic element exposed on the inner side of said wall, a circuit breaker in said cover on the other side of said wall for opening and closing the heater circuit and means by which the thermostatic element normally holds the circuit breaker closed but reacts when heated to cause it to open the heater circuit.

10. In a controlling device, the combination of a liquid container and a receptacle for liquid, a transfer member affording communication therebetween, an electrical heating element for heating the liquid and causing its transference to the receptacle, a main circuit for supplying current to the heating element, a mounting, a switch in the circuit pivotally connected to the mounting, a differential relay in the circuit acting upon energization of a portion of its winding to tilt the switch to circuit closing position, a control circuit comprising a pair of relatively spaced electrodes, thermo-responsive means in the receptacle to connect the electrodes for supplying a neutralizing current to the other portion of the winding of the relay, and means for automatically tilting the switch to the circuit opening position.

11. In a controlling device, the combination of a liquid container and a receptacle for liquid, a transfer member affording communication therebetween, an electrical heating element for heating the liquid in the container and causing transference of the liquid to the receptacle, a main circuit for supplying current to the heating element, a switch in the circuit, a differential relay for closing the switch and having a portion of its winding connected in series with the heating element and the switch, thermo-responsive means associated with the receptacle and acting upon transference of liquid to the receptacle for supplying a neutralizing current to the remaining portion of the relay winding, and means for automatically opening the switch.

12. In a controlling device, the combination of a liquid container and a receptacle for liquid, a transfer member affording communication therebetween, an electrical heating element for heating the liquid in the container and causing transference of the liquid to the receptacle, a main circuit for supplying current to the heating element, a switch in the circuit, a differential relay for closing the switch and having a portion of its winding connected in series with the heating element and the switch, thermo-responsive means associated with the receptacle and acting upon transference of liquid to the receptacle for supplying a neutralizing current to the remaining parts of the relay winding means for automatically opening the switch, and adjustment means for varying the instant of application of neutralizing current to the relay in accordance with the volume of liquid in the receptacle.

13. A coffee maker of the vacuum type comprising upper and lower coffee steeping and water heating bowls in liquid communication, a heating element under said lower bowl to heat the water therein sufficiently to transfer it to said infusion bowl, a cover for said upper bowl, a thermostat controlling said heating element and a housing for said thermostat attached to said cover arranged when said cover is in normal closing position on said bowl to support said thermostat above the level of the liquid in said bowl that is transferred to it from the water steeping bowl whereby the thermostat is subjected to the temperature of the vapor above said liquid.

14. In a controlling device, the combination of a liquid container and a receptacle for liquid, a transfer member affording communication therebetween, an electrical heating element for heating the liquid and causing its transference to the receptacle, a circuit for supplying current to the heating element, a switch in the circuit, and means acting in response to the temperature of the liquid being transferred to effect actuation of the switch for opening the circuit.

15. In a controlling device, the combination of a liquid container and a receptacle for liquid, a transfer member affording communication therebetween, an electrical heating element for heating the liquid and causing its transference from the container to the receptacle, a circuit for supplying current to the heating element, a switch in the circuit, and means in the receptacle acting in response to the temperature of the liquid in the receptacle to effect actuation of the switch for opening the circuit.

16. In a vacuum type coffee maker having a heating chamber and an infusion chamber with a transfer connection therebetween, an electrical heater for the heating chamber, a cover for the infusion chamber, and control means for said heater comprising a float in the infusion chamber and a contactor operated by the float and supported by said cover, whereby to open the heater circuit upon rise of liquid in the infusion chamber.

17. In combination with a vacuum type coffee maker having a bottom vessel and a top vessel connected by a duct of reduced diameter and a heater for the bottom vessel, of a thermostatic control supported on the top vessel and means operated by said thermostatic control for controlling said heater.

18. A coffee maker comprising a water heating vessel, a coffee steeping vessel in liquid communication with said water heating vessel, means for heating the water in said heating vessel to transfer it into said steeping vessel and means responsive to the temperature of said steeping vessel controlling said heating means.

HERMANN LEMP.